March 29, 1960 T. H. BONN ET AL 2,931,017

DRIVE SYSTEMS FOR MAGNETIC CORE MEMORIES

Filed Sept. 28, 1955 2 Sheets-Sheet 1

INVENTOR.
THEODORE H. BONN
BY JOSEPH D. LAWRENCE, JR

Charles E. English

AGENT

March 29, 1960 T. H. BONN ET AL 2,931,017

DRIVE SYSTEMS FOR MAGNETIC CORE MEMORIES

Filed Sept. 28, 1955 2 Sheets-Sheet 2

INVENTORS
THEODORE H. BONN
BY JOSEPH D. LAWRENCE, JR.

Charles C. English
AGENT 2,931,017

DRIVE SYSTEMS FOR MAGNETIC CORE MEMORIES

Theodore H. Bonn and Joseph D. Lawrence, Jr., Philadelphia, Pa., assignors to Sperry Rand Corporation, New York, N.Y., a corporation of Delaware Application September 28, 1955, Serial No. 537,133

27 Claims. (Cl. 340—174)

The present invention relates to switching systems and is more particularly concerned with memory arrays utilizing a plurality of magnetic cores for storage purposes in conjunction with improved means for selectively driving said cores to store information therein, and to selectively reproduce it therefrom at a subsequent time.

Matrices of magnetic cores are known at the present time for providing storage of information, particularly of the binary digital type. In general, such matrices include a plurality of magnetic cores capable of assuming selectively one of two predetermined significances, and the information may be "written into" and/or "read out" of such core elements by preselecting two substantially independent inputs uniquely coupled to a core in question. In general, such matrices require drive means for selectively passing currents through selected windings on core elements and in the past such drive systems have ordinarily taken the form of vacuum tube devices. These known forms of drive have accordingly been subject to the disadvantages that they are relatively bulky, wasteful of power, expensive, fragile and often unreliable, giving rise to serious problems of operating failure and maintenance. Other forms of drive system have accordingly been suggested to obviate the foregoing disadvantages; and one such alternative, in accordance with the present invention, utilizes magnetic amplifiers.

The present invention is thus primarily concerned with memory devices or switching systems employing magnetic amplifier forms of drive; and in particular, relates to drive systems employing unidirectional magnetic amplifiers of the series type and/or of the parallel type for effecting drive currents to a switching matrix. In particular, the present invention relates to such devices for driving two unidirectional matrices and these unidirectional matrices are in turn commonly associated with a plurality of memory lines comprising respectively pluralities of magnetic cores whereby, by the appropriate selection of which matrix is energized, drive current in a preselected one of two possible directions may be coupled to a particular memory line thereby to effect magnetization of a predetermined core in such a line in a preselected one of two possible directions.

It is therefore an object of the present invention to provide an improved magnetic switching system.

A further object of the present invention resides in the provision of improved drive systems for memory devices.

A still further object of the present invention resides in the provision of improved magnetic amplifier drive systems for use with memory devices.

Another object of the present invention resides in the provision of a drive system which may be made in smaller sizes and which is more rugged, less expensive, and less subject to operating failures than has been the case in drive systems known heretofore.

A still further object of the present invention resides in the provision of improved magnetic core memories having better operating characteristics than has been the case heretofore.

A further object of the present invention resides in the provision of improved magnetic core memory systems employing magnetic amplifier drive means.

Another object of the present invention resides in the provision of drive systems for use in memory devices wherein unidirectional amplifiers may be readily isolated from one another and may provide magnetization of memory lines in a preselected one of two possible directions.

In accordance with the present invention, core matrices of types generally well known in the art, may be driven selectively by magnetic amplifier devices. Such magnetic amplifier devices may in turn take the form of unidirectional series magnetic amplifiers, unidirectional parallel magnetic amplifiers, or combinations of these types; and in general, the magnetic amplifier devices so employed for drive purposes are associated with two substantially independent unidirectional drive matrices. Each of these two drive matrices is selectively switched, on two edges, by unidirectional magnetic amplifiers thereby to effect unidirectional current flow through a predetermined portion of the matrix; and the memory lines, comprising pluralities of magnetic cores, are so disposed with respect to the two drive matrices that a given memory line links portions of each matrix, whereby magnetization in either of two possible directions may be accomplished by appropriate selection of which matrix effects drive.

It will be appreciated that in coincident current memories, a memory array may comprise a plurality of memory lines, each of which is associated with control lines in at least two orientations whereby a given memory core may be preselected for the storage or detection of information therein. In the subsequent discussion, the drive systems to be described are concerned with the application of drive to control lines in one orientation only (such as the vertical drive lines associated with a given memory core matrix); and it is to be understood that further drive means, for instance of the types to be described, may be provided for selectively providing drive in a further orientation (such as the horizontal drive lines associated with a given memory core matrix) for a given core memory.

The foregoing objects, advantages, construction and operation of the present invention will become more readily apparent from the following description and accompanying drawings, in which.

Figure 1:
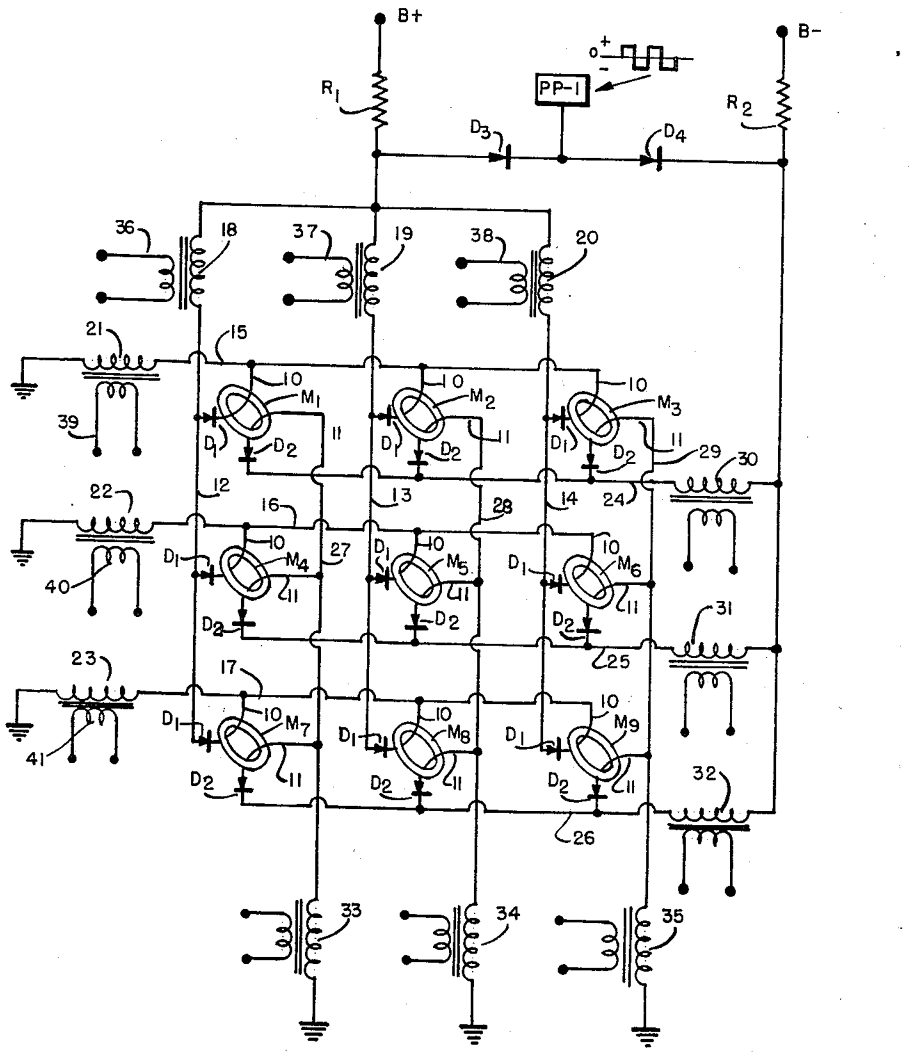
Figure 1 is a schematic representation of one orientation of a core matrix employing a novel drive system in accordance with one embodiment of the present invention.
Figures 2, 3:
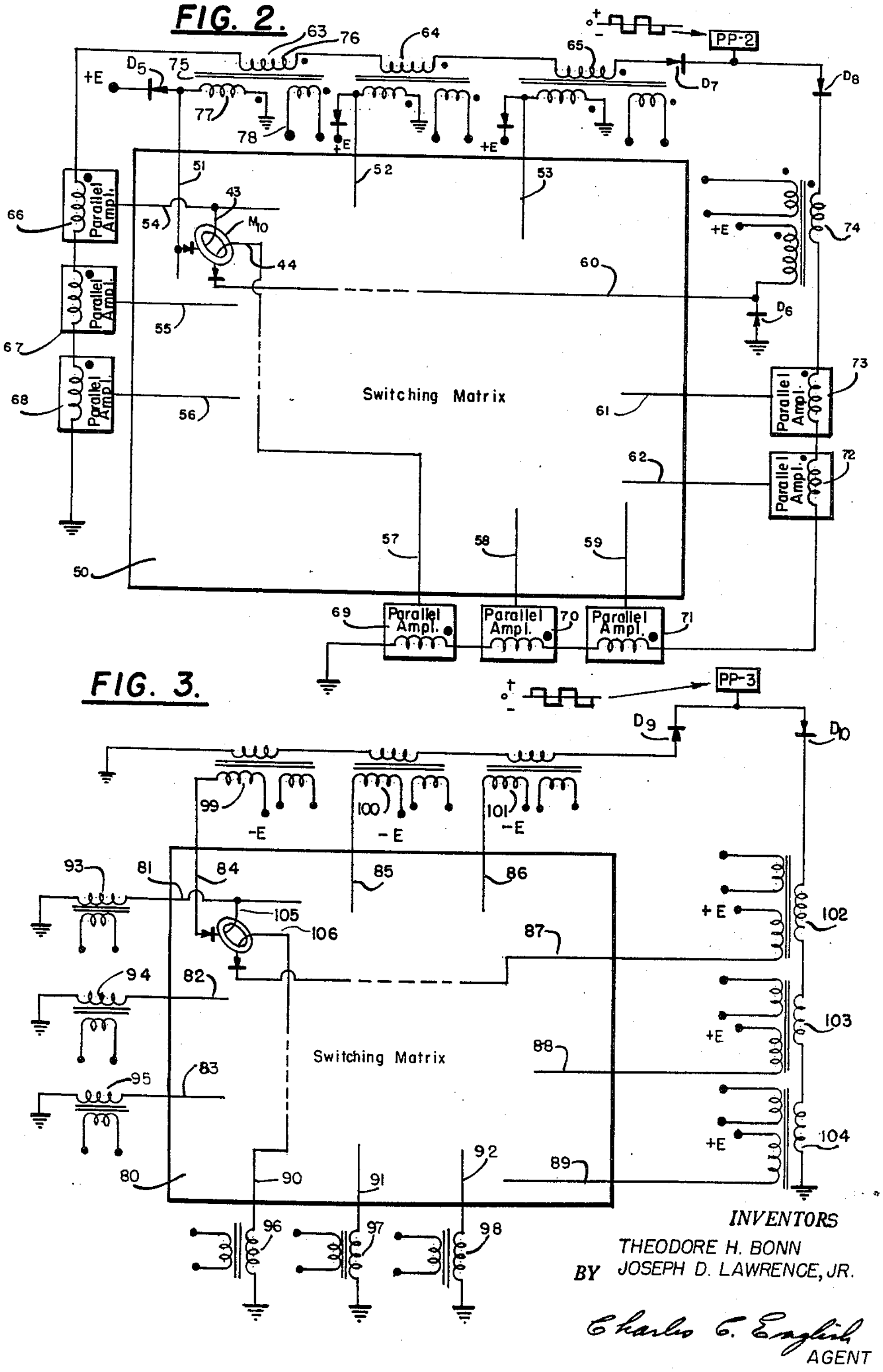
Figure 2 is a partial schematic representation of one orientation of a core matrix employing a novel drive system in accordance with a further embodiment of the present invention.
Figure 3 is a partial schematic representation of one orientation of a core matrix employing a novel drive system in accordance with a still further embodiment of the present invention.

Referring now to Figure 1, it will be seen that, in accordance with the present invention, a switching matrix may comprise a plurality of memory lines $M_1$ through $M_9$ inclusive. Each of the memory lines in Figure 1, as well as in the other embodiments to be described in respect to Figures 2 and 3, has been illustrated by a single magnetic toroid; but it will be appreciated that each such toroid is meant to represent a line of many magnetic cores. In addition, while the embodiments of the invention shown in Figures 1 through 3 illustrate the operation of a switching matrix employing nine memory lines, it must be understood that the concepts of the present invention may be employed for the driving of as many lines as may be desired or required in a given memory system.

Each of the several memory lines $M_1$ through $M_9$ inclusive, links portions of two unidirectional drive systems through the medium of two oppositely poled unidirectional conductors passing through each such memory line. Thus, referring for instance to memory line $M_1$, it will be seen that the magnetic cores represented by $M_1$ are selectively driven in a given orientation by a conductor 10 capable of impressing a magnetizing force on the cores $M_1$ in a first direction; and by a further conductor 11 capable of impressing a magnetizing force on the cores $M_1$ in a direction opposite to that impressed by the conductor 10. The numerals 10 and 11, representing oppositely poled unidirectional conductors, have been utilized to designate such conductors in respect to each of the memory lines $M_1$ through $M_9$, as shown. Each of the unidirectional conductors 10 is coupled, via a rectifier D1, at one of its ends to a vertical drive line 12, 13, 14, etc.; and is coupled at the other of its ends to a horizontal drive line 15, 16, 17, etc. The several vertical drive lines 12, 13 and 14 are selectively drvien by unidirectional series type magnetic amplifiers 18, 19 and 20; and similarly, the several horizontal drive lines 15, 16 and 17 are driven by further unidirectional series type magnetic amplifiers 21, 22 and 23. Thus, the arrangement of unidirectional series amplifiers 18 through 23 in combination with the vertical drive lines 12 through 14, the horizontal drive lines 15 through 17, and the several rectifiers D1, comprises a first magnetic amplifier driven diode matrix capable of selectively effecting unidirectional current through any one of the memory lines $M_1$ through $M_9$ inclusive.

The several unidirectional conductors 11 are similarly coupled at one of their ends via rectifiers D2 to further horizontal drive lines 24, 25 and 26, and are coupled at the other of their ends to further vertical drive lines 27, 28 and 29. The several horizontal drive lines 24 through 26 inclusive are respectively driven by further series type unidirectional magnetic amplifiers 30, 31 and 32; and the several further vertical drive lines 27 through 29 inclusive are also driven by still further unidirectional series type magnetic amplifiers 33, 34 and 35. Again, therefore, the amplifiers 30 through 35 inclusive, in combination with the several horizontal drive lines 24 through 26, the several vertical drive lines 27 through 29, the several rectifiers D2 and the several unidirectional conductors 11, comprise a further diode matrix selectively switching current flow through the several memory lines $M_1$ through $M_9$ in a direction opposite to that effected by the first mentioned switching matrix employing unidirectional conductors 10.

Each of the series type magnetic amplifiers 18 through 23, and 30 through 35, comprises a core of magnetic material having an output winding coupled at one of its ends to a source of energization, and coupled at the other of its ends to one of the drive lines mentioned. The said core of magnetic material also carries a control winding for selectively setting the amplifier in question; and the core of magnetic material utilized in each magnetic amplifier preferably comprises a magnetic material exhibiting a substantially rectangular hysteresis loop, such materials being well known in the art.

Output windings which are usually linked to magnetic toroids such as those that make up each of the memory lines of $M_1$–$M_9$ are omitted from the drawing for simplicity of illustration. Such output windings may be linked to the toroids in various ways, such as by conventional ways that are well known in the art. Such output windings may be connected to various binary digital signal handling apparatus in suitable fashion, for example, in a manner well known in the art.

In operation, the output winding associated with each magnetic amplifier may be caused to assume either a low impedance or a high impedance in dependence upon the hysteretic operating point of its associated magnetic core as controlled by signals applied to the input or "set" winding. Thus, if a signal applied to a set winding in a given magnetic amplifier causes the core of that amplifier to operate at its minus remanence operating point for instance, an applied energization pulse tending to drive the core toward positive magnetization will cause the core to operate over an unsaturated portion of its hysteresis loop whereby a relatively large flux change is effected through the output winding and the output winding exhibits a high impedance. If, on the other hand, the magnetic core associated with a given magnetic amplifier of the series type is caused to operate at its plus remanence operating point, for instance, an applied energization pulse tending to drive the core into positive saturation will cause the said core to operate over a saturated portion of its hysteresis loop whereby a relatively small flux change will be effected in the output winding, and the said output winding will exhibit a low impedance. Thus, each of the magnetic amplifiers 18 through 23 and 30 through 35 may be selectively caused to exhibit either a low impedance or a high impedance whereby the amplifier will produce an appreciable output or substantially no output in dependence upon the condition of signal input applied to the set winding of that amplifier immediately prior to the application of a driving pulse.

The diode matrices illustrated in Figure 1, by employing series type magnetic amplifiers of the type described, may effect appreciable current flow through a given one of the unidirectional conductors mentioned, by causing the series magnetic amplifiers coupled to opposite ends of that unidirectional conductor to exhibit low impedances. Thus, by switching both ends of a given unidirectional conductor by the series magnetic amplifiers illustrated, current may be caused to pass through a given memory line; and the direction of this current flow will be dependent upon which of the unidirectional conductors 10 or 11 is so selected.

Referring more specifically to the circuit shown in Figure 1, it will be seen that the two diode matrices described previously are coupled via resistors R1 and R2 to sources of potential B+ and B− respectively, and are also coupled via rectifiers D3 and D4 to a source of energization pulses PP–1 exhibiting regularly occurring positive and negative going voltage excursions. When PP–1 is negative, rectifier D3 conducts, thereby passing all the current from the source B+. The anode of rectifier D3 drops substantially to the negative potential of the PP–1 output at this time, whereby all of the rectifiers D1 are cut off. During this negative half cycle of PP–1, all but one of amplifiers 18 through 20, associated with vertical drive lines 12 through 14, are set to a high impedance state by applying a signal input to all but one of the set windings 36, 37 and 38, which signal inputs switch all but one of the magnetic cores associated with amplifiers 18 through 20 to an appropriate remanence point. Similarly, during this negative half cycle of PP–1, all but one of the amplifiers 21 through 23 are set to a high impedance state by applying signal inputs to all but one of the further set windings 39, 40 and 41.

When PP–1 goes positive, rectifier D3 is disconnected and all current from the source B+ must pass, via resistor R1 which serves to regulate the current, through the switching array. Those amplifiers of the groups 18 through 20 and 21 through 23, which were set to their high impedance states, will block the flow of current from the source B+ whereby substantially all of the current from B+ must flow through the unset amplifiers only. Thus, if during the negative half cycle of PP–1, all of the amplifiers 18 through 20 and 21 through 23 were set except for vertical amplifier 18 and horizontal amplifier 21, current from the source B+ will pass, during a positive-going power pulse from PP–1, through the resistor R1, through the low impedance output winding of amplifier 18, via vertical line 12, and thence via the rectifier D1 and unidirectional conductor 10 associated with memory line $M_1$, to the horizontal drive line 15, and thence via the low impedance output winding of magnetic amplifier 21 to ground. In short, by setting all but one of the vertical amplifiers and all but one of the horizontal amplifiers in the switching matrix employing amplifiers 18 through 23, current will be caused to pass through one and only one of the unidirectional conductors 10 whereby the memory line associated with that conductor will be impressed with a magnetizing force in a predetermined orientation.

The further switching matrix employing series amplifiers 30 through 35 operates in a manner analogous to that already described in reference to the matrix employing amplifiers 18 through 23, except that these further magnetic amplifiers 30 through 35 are set during a positive half cycle of PP–1 and pass current into the array associated therewith during the negative half cycle of PP–1. The operation of resistor R2, associated with source B−, is thus analogous to that of resistor R1 associated with the source B+, and similarly, the rectifier D4, except for the different polarity considerations, operates in a manner analogous to rectifier D3.

By way of summary, therefore, it will be seen that when a system, such as that shown in Figure 1, is employed, current may be driven through a given memory line in a first direction by setting all but one of amplifiers 18 through 20 and all but one of amplifiers 21 through 23; or current may be driven through a selected memory line in an opposite direction by setting all but one of amplifiers 30 through 32 and all but one of amplifiers 33 through 35.

The particular embodiment illustrated and described in reference to Figure 1 employs unidirectional series type magnetic amplifiers associated with pairs of unidirectional conductors for driving current in either of two possible directions through a predetermined memory line. In accordance with the present invention, the magnetic amplifiers employed for so driving a selected memory line may take the form of unidirectional parallel type amplifiers, and such an embodiment is shown in Figure 2. Thus, referring to Figure 2, it will be seen that a switching matrix 50 may comprise a first plurality of vertical drive lines 51 through 53, a first plurality of horizontal drive lines 54 through 56, a second plurality of vertical drive lines 57 through 59 and a second plurality of horizontal drive lines 60 through 62. Pluralities of memory lines, such as $M_{10}$, selectively link unidirectional conductors such as 43 and 44 and the over-all switching matrix 50 may thus take the form illustrated in Figure 1.

The several vertical and horizontal drive lines are selectively driven by parallel type unidirectional magnetic amplifiers 63 through 74 inclusive; and each such unidirectional parallel type magnetic amplifier is associated with one end of the several horizontal and vertical drive lines, in a manner analogous to that described in reference to the series type amplifiers illustrated in Figure 1.

Referring to parallel type amplifier 63 in Figure 2, it will be seen that each such parallel type amplifier comprises a magnetic core 75, a drive winding 76, an output winding 77, and a set winding 78. In operation, the signal state (e.g. no input signal) at the input to the set winding, such as 78, may cause the core, such as 75, to operate at its plus remanence point, for instance, in which event an applied energization pulse tending to drive the said core into positive saturation effects little flux change through the core whereby substantially no output appears across the output winding, such as 77. If, due to the signal state (e.g. an applied "set" input) on set winding 78, the core, such as 75, should be caused to operate at its minus operating point, for instance, the application of a driving pulse tending to drive the core into positive saturation effects an appreciable flux change in the core whereby a substantial output is developed, by transformer action, across output winding 77. Each of the amplifiers 63 through 65 and 69 through 71 is of the type described in reference to amplifier 63, and each such amplifier includes a clamp comprising a rectifier D5 and a potential source +E serving to limit the output voltage which may be developed across an output winding, such as 77, to +E volts. The amplifiers 66 through 68 and 72 through 74 are analogous in structure to that described in reference to amplifier 63, except that the clamp means comprises a rectifier such as D6 coupled at one of its ends to ground, and coupled at the other of its ends to one end of the amplifier output winding; while the other end of the said amplifier output winding is returned to the source +E.

Again, therefore, the arrangement illustrated in Figure 2 comprises two unidirectional diode matrices each of which is selectively driven on two edges by magnetic amplifiers, this time of the unidirectional parallel type; and these two matrices are returned via rectifiers D7 and D8 to a pulse type energization source PP–2 exhibiting regularly occurring positive and negative going output excursions of potential.

In operation, it will be seen that during a positive excursion of PP–2, rectifier D7 is cut off and no current flows in the drive windings of amplifiers 63 through 68, which drive windings are connected in series, as shown. If, during such a positive excursion of PP–2, therefore, one of the amplifiers 63 through 65 is set and one of the amplifiers 66 through 68 is also set, then during the next subsequent negative half cycle of PP–2, drive current will be caused to flow from ground through the drive windings of each of amplifiers 63 through 65 and 66 through 68, causing the two set amplifiers to have an output. This output current will in turn flow through the memory line that is common to the two set amplifiers. For instance, if the amplifiers 66 and 63 had been set during the aforementioned positive-going excursion of PP–2, output potential will be developed across the output windings of these amplifiers 63 and 66 during the occurrence of the next subsequent negative-going power pulse from source PP–2 whereby current will flow through unidirectional conductor 43 associated with memory line $M_{10}$, impressing the desired magnetization force on the cores of the said memory line $M_{10}$. It will thus be seen that unidirectional current may be effected through any of the memory lines comprising the switching matrix 50 by appropriately setting one of the amplifiers 63 through 65 and one of the amplifiers 66 through 68.

Amplifiers 69 through 71 and 72 through 74 operate in the manner analogous to that already described, and these amplifiers, which comprise the drive means for the further switching matrix utilizing vertical lines 57 through 59 and horizontal lines 60 through 62, are associated with rectifier D8 and the source PP–2 to selectively drive current through a unidirectional conductor 44 in a direction opposite to that of current flowing selectively through conductor 43.

Again it will be appreciated that when it is desired to pass magnetizing current through one of the conductors 44 in the switching matrix 50, one of the vertical amplifiers 69 through 71 and one of the horizontal amplifiers 72 through 74 will be set, this time during a negative excursion of source PP–2 whereby the desired output current will be effected through the preselected memory line during the next subsequent positive excursion of source PP–2.

Combinations of the above described series and parallel type amplifiers may be employed in effecting the desired drive of pairs of unidirectional conductors associated with pluralities of memory lines. Thus, referring to Figure 3, it will be seen that a switching matrix 80 may once more comprise a first plurality of horizontal drive lines 81, 82 and 83, a first plurality of vertical drive lines 84, 85 and 86; a second plurality of horizontal drive lines 87, 88 and 89 and a second plurality of vertical drive lines 90, 91 and 92. The switching matrix 80 is again associated with memory lines comprising pluralities of memory cores and takes a configuration analogous to that already described in reference to Figures 1 and 2. The first plurality of horizontal drive lines, 81 through 83, may be selectively switched at one of their ends by series type unidirectional magnetic amplifiers 93, 94 and 95; and similarly, the second plurality of vertical drive lines, 90 through 92, may be selectively switched by further series type unidirectional amplifiers 96, 97 and 98. Each of the series type unidirectional magnetic amplifiers 93 through 98 operates in a manner analogous to that described in reference to Figure 1.

The first plurality of vertical drive lines 84 through 86 may be selectively switched at one of their ends by unidirectional parallel type magnetic amplifiers 99 through 101; and the second plurality of horizontal drive lines 87 through 89 may similarly be switched at one of their ends by unidirectional parallel type magnetic amplifiers 102 through 104. Again, each of the amplifiers 99 through 104 operates in a manner analogous to that described in reference to Figure 2.

The several amplifiers are coupled, as shown, via rectifiers D9 and D10 to a source of energization PP–3 exhibiting regularly occurring positive and negative going excursions of output current. During a positive half cycle of PP–3, all but one of the series amplifiers 93 through 95 may be set to a high impedance state and a single one of the parallel amplifiers 99 through 101 may similarly be set. During the next subsequent negative half cycle of PP–3, the set parallel amplifier of the group comprising amplifiers 99 through 101 drives current into the memory and this current is blocked by all but the single unset series amplifier of the group comprising amplifiers 93 through 95. Thus, current is permitted to flow through only a single one of the unidirectional conductors associated with a given memory line. If, for instance, the amplifier 93 is the only series amplifier not set to a high impedance state, while the amplifier 99 is set, current will flow through the unidirectional conductor 105.

The operation of the further matrix employing series amplifiers 96 through 98, and the parallel amplifiers 102 through 104, is analogous to that already described; and once more, one of the parallel amplifiers 102 through 104 is set, this time during a negative half cycle of the source PP–3, while all but one of the series amplifiers 96 through 98 are set during such a negative cycle of source PP–3 whereby current may be caused to flow through a single further unidirectional conductor 106 during the next subsequent positive half cycle of PP–3.

It will be noted that one terminal of amplifiers 99 through 101 is returned to a negative potential −E so that the several rectifiers associated with unidirectional conductors 105, are cut off even though the setting of the series amplifiers, such as 93 through 95, applies a negative potential to the cathodes of these rectifiers. Similarly, one terminal of the parallel amplifiers 102 through 104 is returned to a positive potential +E to perform an analogous function during the setting of series amplifiers 96 through 98.

While we have described preferred embodiments of the present invention, many variations will be suggested to those skilled in the art. While the switching matrices described herein have been explained as used to drive magnetic core memories; they are also suitable for controlling storage devices other than core memories and for controlling loads (mechanical actuators, for instance) other than storage devices. The foregoing description is, therefore, meant to be illustrative only and all such variations as are in accord with the principles described are meant to fall within the scope of the appended claims.

Having thus described our invention, we claim:

1. In a switching device, a first matrix comprising a first plurality of unidirectionally conductive conductors, first magnetic amplifier drive means having output winding means coupled to said conductors of said first matrix for selectively effecting current flow through a selected one of said first plurality of conductors in a first predetermined direction, a second matrix comprising a second plurality of unidirectionally conductive conductors, second magnetic amplifier drive means having output winding means coupled to said conductors of said second matrix for selectively effecting current flow through a selected one of said second plurality of conductors in a second predetermined direction opposite to said first predetermined direction, and a plurality of loads each of which differently links at least one of said first plurality of conductors and at least one of said second plurality of conductors whereby current may be selectively driven through each of said conductors to energize a selected one of said loads in a preselected one of two possible directions.

2. The switching device of claim 1 wherein each of said loads comprises a plurality of magnetic memory cores each of which is capable of assuming stable remanent conditions.

3. The device of claim 1 wherein said first and second matrices each comprise pluralities of drive lines, said first and second drive means comprising amplifiers selectively switching both ends of each of said drive lines.

4. The device of claim 3 wherein said amplifiers include unidirectional series type magnetic amplifiers.

5. The device of claim 3 wherein said amplifiers include unidirectional parallel type magnetic amplifiers.

6. The device of claim 3 wherein said amplifiers comprise unidirectional magnetic amplifiers of both the series and parallel types.

7. In a memory device, a first plurality of conductors, first magnetic amplifier control means operative during selected ones of a first plurality of spaced time intervals for selectively effecting a first unidirectional current flow through preselected ones of said first plurality of conductors, a second plurality of conductors, second magnetic amplifier control means operative during selected ones of a second plurality of spaced time intervals occurring respectively intermediate said first spaced time intervals for selectively effecting a second unidirectional current flow through preselected ones of said second plurality of conductors, and a plurality of information storage devices each of which is coupled to at least one conductor in each of said first and second pluralities of conductors, said first and second unidirectional current flows being respectively of opposite directions with respect to a given storage device whereby each of said storage devices may be selectively and bi-directionally switched.

8. The memory device of claim 7 wherein each of said storage devices comprises a core of magnetic material capable of assuming stable remanent conditions, whereby said cores of magnetic material may be selectively impressed with a magnetization force of either one of two possible directions.

9. The memory device of claim 7 wherein each of said storage devices comprises a plurality of magnetic cores exhibiting a substantially rectangular hysteresis loop.

10. In a memory device, a storage element, a control line coupled to said storage element, rectifier means in series with said control line whereby said control line is unidirectionally conductive, a first unidirectional magnetic amplifier coupled to one end of said control line, a second unidirectional magnetic amplifier coupled to the other end of said control line, each of said first and second magnetic amplifiers including a core of magnetic material capable of exhibiting stable remanent conditions, and means selectively switching each of said first and second magnetic amplifiers to a conductive state thereby selectively to effect a unidirectional current flow through said storage element.

11. The device of claim 10 wherein each of said first and second magnetic amplifiers is of the series type.

12. The device of claim 10 wherein each of said first and second magnetic amplifiers is of the parallel type.

13. The device of claim 10 wherein one of said first and second magnetic amplifiers is of the series type and the other of said magnetic amplifiers is of the parallel type.

14. The device of claim 10 wherein said storage element comprises a plurality of cores of magnetic material each of which cores is capable of assuming stable remanent conditions.

15. In a switching device, a load element, first and second distinct control lines coupled to said load element, first and second rectifier means in series with said first and second control lines respectively, whereby each of said first and second control lines is unidirectionally conductive, first magnetic amplifier means selectively switching said first unidirectional control line for selectively effecting a current flow to drive said load element in a first direction, and second magnetic amplifier means selectively switching said second unidirectional control line for selectively effecting a current flow to drive said load element in a second direction opposite to said first direction.

16. The switching device of claim 15 wherein said load element comprises an information storage device.

17. The device of claim 16 wherein said storage device comprises a core of magnetic material exhibiting a substantially rectangular hysteresis loop.

18. In a memory device, a storage element, first and second distinct control lines coupled to said storage element, means coupled to said first and second control lines for rendering said lines unidirectionally conductive in opposite directions to one another relative to said storage element, a first pair of magnetic amplifiers respectively coupled to opposing ends of said first control line for selectively switching current to drive said storage element in a first predetermined direction, and a second pair of magnetic amplifiers respectively coupled to opposing ends of said second control line for selectively switching current to drive said storage element in a second predetermined direction opposite to said first direction.

19. In a switching system, a first matrix comprising first and second pluralities of control lines, a first plurality of unidirectionally conductive conductors respectively linking said first and second pluralities of control lines, a first plurality of magnetic amplifiers selectively switching a preselected one of both said first and second pluralities of control lines thereby selectively to effect current flow through the selected one of said first plurality of unidirectionally conductive conductors linking the switched control lines of said first and second pluralities of lines, a second matrix comprising third and fourth pluralities of control lines, a second plurality of unidirectionally conductive conductors respectively linking said third and fourth pluralities of control lines, a second plurality of magnetic amplifiers selectively switching a preselected one of both said third and fourth pluralities of control lines thereby selectively to effect current flow through the selected one of said second plurality of unidirectionally conductive conductors linking the switched control lines of said third and fourth pluralities of lines, and a plurality of load devices each of which is coupled to at least one of said first plurality of unidirectionally conductive conductors and to at least one of said second plurality of unidirectionally conductive conductors.

20. The system of claim 19 wherein said load devices comprise magnetic storage devices comprising magnetic cores capable of assuming stable remanent conditions.

21. The system of claim 19 wherein said first and second pluralities of magnetic amplifiers each comprise unidirectional series type magnetic amplifiers.

22. The system of claim 19 wherein said first and second pluralities of magnetic amplifiers each comprise unidirectional parallel type magnetic amplifiers.

23. The system of claim 19 wherein said first and second pluralities of magnetic amplifiers each comprise both unidirectional series type and unidirectional parallel type magnetic amplifiers.

24. A switching system comprising first and second magnetic devices each including magnetic element means having substantial remanence, input winding means, and output winding means, magnetic information translating means each including first and second winding means, separate unidirectional impedances coupling a terminal of said first and second information winding means respectively to said output winding means of said first and second devices, said unidirectional impedances being poled so that said first and second information winding means are respectively energized in opposite directions by said output winding means, means for respectively applying pulses to said first and second device output winding means at alternately occurring first and second times in the forward directions of the respective ones of said unidirectional impedances so as to tend to energize said first and second information winding means in opposite directions respectively, means for coupling said pulse applying means to other terminals of said first and second information winding means, and means for selectively energizing said first and second device input winding means at said second and first time respectively, thereby to set the remanent states of said element means to control the passage of said pulses through said output winding means.

25. In combination with a coincident-current magnetic memory including a plurality of binary magnetic information storage means each having first and second selection winding means, a selection system therefor comprising a plurality of drive systems for providing coincident-current drive of said selection winding means, each comprising a plurality of first and second magnetic devices each including magnetic element means having substantial remanence, input winding means, and output winding means, separate unidirectional impedances coupling a terminal of each of a plurality of said first selection winding means and each of a plurality of said second selection winding means to said output winding means of a different one of said first and a different one of said second devices respectively, said unidirectional impedances being poled so that each of said first and each of said second selection winding means are energized in opposite directions respectively via the associated ones of said output winding means, means for respectively applying pulses to said output winding means of said first and second magnetic devices at alternately occurring first and second times in the forward directions of the respective ones of said unidirectional impedances so as to tend to energize said first and second selection winding means in opposite directions respectively, means for coupling said pulse applying means to other terminals of said first and second selection winding means, and means for selectively energizing said first and second device input winding means at said second and first times respectively thereby to set the remanent states of said element means to control the production of said pulses in said output winding means and the energization of said selection winding means.

26. In combination with a plurality of binary magnetic information translating means each having first and second selection winding means, a selection system therefor comprising a plurality of first and second control devices each including a settable element means, an input circuit, and an output circuit having a unidirectional impedance, the conductive state of each of said output circuits being determined by the condition of the associated settable element means, means for coupling a terminal of each of a plurality of said first selection winding means and each of a plurality of said second selection winding means to said output circuit of a different one of said first and a different one of said second devices respectively, said unidirectional impedances being poled so that each of said first and each of said second selection winding means are energized in opposite directions respectively via the associated ones of said output circuits, means for respectively applying pulses to said output circuits of said first and second control devices at alternately occurring first and second times in the forward directions of the respective ones of said unidirectional impedances so as to tend to energize said first and second selection winding means in opposite directions respectively, means for coupling said pulse applying means to other terminals of said first and second selection winding means, and means for selectively energizing said first and second device input winding means at said second and first times respectively thereby to set the conditions of said settable element means to control the production of said pulses in said output winding means and the energization of said selection winding means.

27. In combination with a coincident-current magnetic memory including a plurality of binary magnetic information storage means each having first and second selection winding means, a selection system therefor comprising a plurality of drive systems for providing coincident-current drive of said selection winding means, each comprising a plurality of first and second control devices each including a settable element means, an input circuit, and an output circuit having separate unidirectional impedance, the conductive state of each of said output circuits being determined by the condition of the associated settable element means, means for coupling a terminal of each of a plurality of said first selection winding means and each of a plurality of said second selection winding means to said output circuit of a different one of said first and a different one of said second devices respectively, said unidirectional impedances being poled so that each of said first and said second selection winding means are energized in opposite directions respectively via the associated ones of said output circuits, means for respectively applying pulses to said output circuits of said first and second control devices at alternately occurring first and second times in the forward directions of the respective ones of said unidirectional impedances so as to tend to energize said first and second selection winding means in opposite directions respectively, means for coupling said pulse applying means to other terminals of said first and second selection winding means and means for selectively energizing said first and second device input winding means at said second and first times respectively thereby to set the conditions of said settable element means to control the production of said pulses in said output circuits and the energization of said selection winding means.

References Cited in the file of this patent

UNITED STATES PATENTS

| | | |
|---|---|---|
| 2,088,699 | Hailes | Aug. 3, 1937 |
| 2,691,154 | Rajchman | Oct. 5, 1954 |
| 2,696,600 | Serrell | Dec. 7, 1954 |
| 2,734,187 | Rajchman | Feb. 7, 1956 |